Patented Oct. 4, 1949

2,483,887

UNITED STATES PATENT OFFICE 2,483,887

CATALYST COMPRISING DISPERSED ALKALI METAL AND ALKALI METAL MERCAPTIDE AND POLYMERIZATION PROCESS EMPLOYING SAID CATALYST

Willie W. Crouch, Bartlesville, Okla., assignor to Phillips Petroleum Company, a corporation of Delaware No Drawing. Application May 23, 1946, Serial No. 671,900

18 Claims. (Cl. 260—84.3)

The present invention relates to a process and catalyst for the polymerization of polymerizable organic compounds. In one of its more specific aspects it relates to a process for the mass polymerization of a conjugated diolefin and to the improved product produced thereby. Another aspect of the invention is the method of preparation of a catalyst for the polymerization of polymerizable organic compounds and the improved polymerization catalyst so prepared. In one of its more specific aspects this invention relates to the mass copolymerization of butadiene and styrene using an improved alkali metal contact catalyst and to the improved product produced by this process.

The present invention provides a process especially suited for the mass polymerization of polymerizable organic compounds catalyzed by an alkali metal. It also provides improved alkali metal catalysts in the form of stable suspensions of the alkali metal in a suitable dispersing medium with the metal in an extremely fine state of division. The polymerization process forming part of the present invention is particularly adapted to mass copolymerization of butadiene and styrene monomers to form rubber-like elastomers. A stable suspension of an alkali metal prepared by the method disclosed herein is used as a catalyst for the polymerization reaction. The method of preparation of the catalyst, which is also a part of the present invention, involves the use of a selected surface active agent to accomplish the suspension of the alkali metal in a finely divided form.

Mass polymerization of conjugated diolefins, especially of 1,3-butadiene, isoprene and 2,3-dimethyl butadiene has long been known to be capable of resulting in high polymers or synthetic elastomers having high elasticity and resembling natural gum rubber. While the reaction is essentially one of thermopolymerization it has been found that alkali metals, particularly sodium and potassium, accelerate the reaction markedly. In spite of the demand for improved synthetic elastomers, the difficulties attendant upon this type of polymerization have made it unattractive and have retarded commercial development of the process. One of the major problems which has confronted the development of mass polymerization has been the dissipation of the heat of polymerization. If this heat is not dissipated rapidly polymers of poor quality are produced and, in addition, charring of the product, serious explosions, fires, etc., are likely to occur. Failure to solve these important technical problems directed emphasis to polymerization in aqueous emulsions of the monomers. It is obvious that alkali metal catalysts are inapplicable in aqueous emulsion polymerization systems and, therefore, it has been necessary to resort to other means for initiating the reaction.

Even though the emulsion polymerization process has been developed and is used widely on a commercial scale, the elastomers produced possess certain properties which render them inferior to natural rubber for many uses. One property which is the most detrimental is that of heating in use, the so-called hysteresis temperature rise, which is pronounced for this type of polymer. The balance between this property and the number of flexures possible before the sample fails ("flex life") is still one important area in which emulsion polymers are notably deficient.

An object of the present invention is to provide a novel process for the polymerization of polymerizable organic compounds. Another object of the present invention is to provide a novel process for the polymerization of organic materials using an alkali metal as a catalyst. A more specific object is to provide such a process which is particularly suited to the mass copolymerization of butadiene and styrene using a dispersion of a comminuted alkali metal as catalyst. Another object of the present invention is to provide an improved alkali metal catalyst for polymerization reactions. Still another object is to provide an improved method for the preparation of a stable suspension of finely divided alkali metal in a suitable dispersing medium. Still another object of the present invention is to provide an improved polymer or elastomer prepared by the polymerization process of this invention.

I have now found that mass polymerization of conjugated diolefins may be carried out successfully on an industrial scale, in the presence of catalysts consisting of stable suspensions of alkali metals, to produce polymers which have particularly good properties and are of uniform quality. In a copending application of W. A. Schulze and J. C. Hillyer, Serial No. 677,354, filed June 17, 1946, there is described a continuous process whereby the mass polymerization of conjugated diolefins may be advantageously accomplished. The present process relates to another method for effecting this polymerization of diolefins in the presence of finely divided, metal catalysts prepared by dispersing the metal in a dispersing medium in the presence of selected surface active agents. Through the application of the catalysts of this invention the drawbacks and operational difficulties of previous processes are almost completely eliminated.

By the process of this invention polymers of remarkable uniformity and superior properties may be prepared, with greater ease and much safer operation than has heretofore been possible, through the use of finely divided metal catalysts, for example, sodium, said catalysts being employed in the form of stable suspensions and prepared in the presence of surface active agents, for example, mercaptides of alkali metals. Heretofore mass polymerizations with alkali metal catalysts, particularly those polymerizations involving the use of simple diolefin monomers, have generally been unsuccessful primarily on account of difficulties inherent in the catalysts. When sodium is employed in the form of chunks, or even fine wire or ribbon, the polymers which result are hard. This hardness is particularly noticeable near the sodium surface. At the same time much of the remaining butadiene polymerizes only to a very soft, sticky, semi-liquid material. Iron rods coated with sodium or potassium are likewise unsatisfactory as are any methods which do not produce the catalyst in finely divided form. The operational difficulties which arise when these forms of alkali metal catalysts are employed are numerous and the nonuniformity of the polymers makes such processes of little value in commercial operations. On the other hand, when alkali metal catalysts are prepared in such a way as to present a large surface area and the process operated to insure intimate contact of catalyst and reactants, polymers possessing superior properties as well as uniform quality are obtained.

When operating with metal catalysts it is necessary to maintain a fine state of dispersion of catalyst with reactants. By vigorous agitation, the reactants may be kept in a fairly homogeneous state at the beginning of the polymerization but as the reaction proceeds the mixture becomes viscous and the catalyst tends to collect toward the bottom of the reaction zone. As a result of this settling out of the catalyst, polymerization is accelerated in certain areas and is finally localized in regions of relatively high catalyst concentration thus causing overheating and nonhomogeneity of the polymer. In the present process these difficulties are overcome by preparing the catalyst by a special method, namely, by comminuting the alkali metal in a dispersing medium using a surface active agent, particularly a mercaptide of an alkali metal. By this method a very finely divided, stable suspension of the metal is obtained and intimate contact of the catalyst and the reactants is insured throughout the operation.

The use of surface active agents in the preparation of suspensions of alkali metal catalysts promotes the formation of catalyst particles of uniform size. When the general procedure is followed for the preparation of catalysts of this type, that is, without the use of surface active agents, the particles which result show appreciable variation in size with a considerable proportion of them being relatively large. It is a well established fact that only the surface of the catalytic material promotes active polymerization. It is, therefore, obvious that large particles have a relatively high mass of metal per unit of active surface and, when these catalysts are employed in large scale commercial operations, an economic factor of considerable importance is introduced. When large catalyst particles are present, there is also the increased difficulty and expense of destroying and removing all the metal from the finished polymer. The large particles are slow to react and excessive quantities of the reagent, such as methanol, are required.

In one specific embodiment the present process comprises the copolymerization of butadiene and styrene in the presence of a suspension of very finely divided metallic sodium as catalyst. A dispersion medium for the catalyst, e. g., xylene, previously dried and purified by distillation, is charged to a suitable vessel equipped with a high speed stirrer where it is heated to about 210° F. or higher in an atmosphere of dried oxygen-free nitrogen. Freshly cut sodium is then charged to the vessel after which a selected mercaptan, e. g., tertiary dodecyl mercaptan, is added in sufficient amount to give a quantity of sodium mercaptide equivalent to about 0.5 to 5.0 per cent of the weight of the sodium use. The temperature is adjusted to about 230° F. while the mixture is vigorously agitated by stirring at high speed (5,000 to 10,000 R. P. M.) from about 5 to about 60 minutes or until a stable dispersion is obtained. The system is allowed to cool to about 210° F. and agitation is stopped.

Copolymerization of butadiene and styrene is carried out using the conventional proportions of butadiene (75 parts) and styrene (25 parts). The reaction is accomplished in the presence of a minor quantity of the catalyst suspension, for example, 0.1 to 0.5 per cent of the total monomer weight being sodium, and the mixture agitated while the temperature is held within the range of about 80 to 125° F. Based on the monomer charge, from about 0.0005 to about 0.025 weight per cent sodium mercaptide is present in the charge to the reactor. The sodium catalyst is first introduced into the reactor after which a portion of the butadiene is charged, followed by the styrene and then the remainder of the butadiene. At the completion of the reaction the polymer is removed by conventional means, such as by solution of the polymer in benzene followed by precipitation with methanol, or the sodium may be destroyed by washing with water on a wash mill. The polymers thus formed are of uniform quality and possess properties superior to polymers obtained by other methods.

The metals applicable for the preparation of the catalysts of this invention are the alkali metals. For economic reasons sodium and potassium are most generally used with sodium usually preferred. In the catalyst preparation a dispersion is formed containing from about 5 to about 35 weight per cent of the alkali metal, and preferably from about 10 to about 20 weight per cent of the alkali metal. Using from 0.5 to 5 per cent by weight mercaptide (based on the weight of the sodium) the dispersion contains from about 0.025 to about 1.75 weight per cent mercaptide.

The dispersing agents which may be employed for the preparation of the catalyst suspensions described herein are toluene, xylene, mineral oil, paraffin wax and many other inert materials with boiling points sufficiently high for satisfactory operation of the process. When temperatures of about 210 to 230° F. are employed, xylene is often preferred as the dispersing material.

The catalyst dispersion stabilizers employed in this invention are mercaptides of alkali metals. The mercaptides may be prepared from mercaptans containing from about to eight to about twenty carbon atoms with those containing from about twelve to about sixteen carbon atoms generally preferred. Tertiary alkyl mercaptans containing from twelve to sixteen carbon atoms per molecule are particularly effective. Instead of using the mercaptides, mercaptans may be added directly to the sodium contained in the dispersion medium in an amount sufficient to produce mercaptides equivalent to from 0.5 to about 5.0 per cent by weight of the sodium. Generally about 2.0 per cent by weight of the mercaptide is considered satisfactory.

In carrying out mass polymerization reactions, such as those described herein, it is often considered desirable to use a diluent. Among the materials applicable for this purpose are isobutane and higher boiling paraffinic hydrocarbons, for example, n-butane, n-pentane and n-heptane, cycloparaffins, e. g., cyclohexane, and aromatic hydrocarbons, e. g., benzene.

It is hereinbefore stated that particle size is an important factor in the satisfactory operation of this invention. When ordinary methods of catalyst preparation are employed, such as shaking a heated mixture of metal and dispersing agent, the average particle size is often about 0.1 to 0.2 mm. These particles settle out rapidly thus rendering the catalyst ineffective for the production of a homogeneous polymer. When high speed stirring methods are employed, it is possible to produce much more effective dispersion of the metal but there still remains the disadvantage of coalescence of the particles when stirring is stopped. According to the method of my invention the addition of a dispersion stabilizer, e. g., a sodium mercaptide, to the mixture of dispersing medium and metal, followed by high speed stirring, produces a catalyst of particle size ranging from about 0.01 to 0.02 mm. which does not undergo coalescence upon standing. In addition to producing very small particles of metal, the present method yields stable catalyst suspensions which not only greatly accelerate mass polymerization reactions but also give polymers possessing the desired characteristics. The extremely small particle size is particularly advantageous since it makes possible more effective contact between catalyst and reactants and also affords a method of bringing about the polymerization reactions with a much smaller quantity of catalyst than is ordinarily required.

The polymers prepared through the use of the catalysts of this invention have particularly desirable properties, especially hysteresis-flex life balance. Not only do samples of the polymers excel in these properties but they also have other characteristics equal to or better than those possessed by polymers obtained by other methods.

*Example I*

A finely divided sodium catalyst was prepared in the following manner: 160 grams of dry toluene, 16 grams of sodium and 0.32 gram tertiary dodecyl mercaptan were charged to a 500 ml. creased, round flask equipped with a finned metal stirrer and the contents heated to 230° F. and stirred at the rate of 9,000 to 10,000 R. P. M. for twenty minutes. The system was allowed to cool to 210° F. after which stirring was discontinued. The preparation of the catalyst was carried out in an atmosphere of nitrogen to prevent oxidation of the sodium. The average particle size of the catalyst was about 0.02 mm.

To a pressure autoclave containing the catalyst, styrene was charged followed by butadiene and the polymerization was carried out over an 8.5-hour period at a temperature of 85° F. with continuous agitation. The reactants used were in the ratio of 0.3 part sodium, 25 parts styrene and 75 parts butadiene. At the conclusion of the reaction the polymer was dissolved in benzene and precipitated by the addition of methanol. Two parallel runs gave intrinsic viscosities of 2.43 and 2.59, respectively. No gel was formed and a polymer of uniform quality was obtained.

In contrast to the results obtained with a catalyst prepared using tertiary dodecyl mercaptan as a suspension stabilizer, a catalyst was prepared in a similar manner, but using no mercaptan. The size of the catalyst particles varied from 0.02 to 0.1 mm. The polymer had an intrinsic viscosity of 4.85 and contained 7.3 per cent gel. Examination of the product revealed a very noticeable lack of uniformity.

*Example II*

A catalyst was prepared as in Example I using 160 grams xylene, 32 grams sodium and 0.32 gram tertiary dodecyl mercaptan. The particle size of the catalyst was 0.02 mm. The same polymerization recipe and procedure as those used in Example I were employed. The reaction time was seven hours. Two parallel runs gave intrinsic viscosities of 3.09 and 3.42, respectively. In one case no gel was formed while in the other 3.0 per cent gel was noted. The polymers were uniform throughout and showed desirable processing characteristics.

*Example III*

A mass polymerization reaction was effected over a seven-hour period using a catalyst prepared from 160 grams xylene, 32 grams sodium and 0.64 gram tertiary dodecyl mercaptan. The size of the catalyst particles was 0.01 to 0.02 mm. The polymerization recipe and procedure used in Example I were followed. Two reactions carried out simultaneously showed only a trace of gel and gave values of 3.01 and 3.30 for the intrinsic viscosity.

Since certain changes may be made in carrying out the above process without departing from the scope of the invention, it is intended that all matter contained in the foregoing description of the invention shall be interpreted as illustrative and not in a limiting sense.

I claim:

1. A process for the polymerization of a conjugated diolefin which comprises admixing said diolefin with a liquid inert hydrocarbon dispersion containing a finely divided and dispersed alkali metal in an amount equivalent to from about 0.1 to about 0.5 weight per cent of said diolefin and a mercaptide of said alkali metal in an amount equivalent to from about 0.5 to about 5.0 weight per cent of the alkali metal.

2. In a process for the polymerization of butadiene in the presence of finely dispersed metallic sodium as a catalyst, the improvement which comprises carrying out the polymerization reaction in the presence of a sodium mercaptide in an amount equivalent to from about 0.5 to about 5.0 weight per cent of the sodium employed.

3. A process for the copolymerization of butadiene and styrene which comprises admixing said butadiene and styrene and incorporating therewith from about 0.1 to about 0.5 weight per cent comminuted sodium and from about 0.0005 to about 0.025 weight per cent of sodium mercaptide in a dispersion in a liquid inert hydrocarbon.

4. A process for the preparation of a copolymer of 1,3-butadiene and styrene which comprises polymerizing in admixture about 75 parts by weight 1,3-butadiene and 25 parts by weight styrene and incorporating therewith in a liquid inert hydrocarbon dispersion from about 0.1 to about 0.5 weight per cent sodium and from about 0.0005 to about 0.025 weight per cent of a sodium mercaptide, and continuously agitating the resulting mixture at a temperature within the range of from about 80 to about 125° F. until the polymerization reaction is substantially complete.

5. In a process for the production of a copolymer of butadiene and styrene in the presence of finely divided and dispersed metallic sodium as a catalyst, the improvement which comprises carrying out the polymerization reaction in the presence of a sodium mercaptide containing from about 8 to about 20 carbon atoms per molecule in an amount equivalent to 0.5 to 5.0 weight per cent of the sodium employed.

6. In a process for the preparation of a copolymer of butadiene and styrene in the presence of finely divided and dispersed metallic sodium as a catalyst, the improvement which comprises carrying out the reaction in the presence of a sodium mercaptide prepared by the interaction of metallic sodium with a tertiary alkyl mercaptan containing from 12 to 16 carbon atoms per molecule in an amount equivalent to from about 0.5 to about 5.0 weight per cent of the sodium employed.

7. A method for the preparation of a finely divided dispersion of an alkali metal in a liquid inert hydrocarbon which comprises comminuting said alkali metal in said hydrocarbon in the presence of a mercaptide of said alkali metal.

8. A method for the preparation of a dispersion of an alkali metal in a liquid inert hydrocarbon which comprises comminuating said alkali metal in said hydrocarbon in the presence of from about 0.5 to about 5.0 weight per cent of a mercaptide of said metal containing from about 8 to about 20 carbon atoms per molecule.

9. A method for the preparation of a dispersion of metallic sodium in a liquid inert aromatic hydrocarbon which comprises comminuting metallic sodium in said hydrocarbon in the presence of from about 0.5 to about 5.0 weight per cent of a sodium mercaptide having from about 8 to about 20 carbon atoms per molecule.

10. A method for the preparation of a dispersion of metallic sodium in xylene which comprises adding from about 5 to about 35 weight per cent metallic sodium to liquid xylene and comminuting the metallic sodium in the xylene by vigorous agitation at a temperature within the range of from about 210 to about 230° F. and in the presence of from about 0.5 to about 5 weight per cent based on the sodium of a sodium mercaptide prepared by the interaction of metallic sodium and a tertiary alkyl mercaptan containing from 12 to 16 carbon atoms per molecule.

11. A catalyst for the polymerization of conjugated diolefins which comprises particles of metallic sodium having an average diameter within the range of from about 0.01 to about 0.02 mm. dispersed in xylene containing from about 0.5 to about 5.0 per cent by weight based on the sodium of a sodium mercaptide containing from about 8 to about 20 carbon atoms per molecule.

12. In a process for the polymerization of a polymerizable organic compound in the presence of a finely divided, dispersed alkali metal as polymerization catalyst, the improvement which comprises admixing said dispersed alkali metal with said polymerizable compound in the form of a dispersion of particles having an average diameter not greater than about 0.02 mm. in an inert liquid dispersing medium together with a minor amount, based on said alkali metal and not greater than 5 per cent by weight thereof, of a mercaptide of an alkali metal.

13. The improvement of claim 12 in which said dispersed alkali metal is sodium and is admixed with said polymerizable organic compound in an amount of 0.1 to 0.5 per cent by weight thereof and said mercaptide is a sodium mercaptide of a tertiary alkyl mercaptan having between 12 and 16 carbon atoms per molecule and is present in said dispersion in an amount between 0.5 and 5.0 per cent by weight of said dispersed sodium catalyst.

14. In a process for the polymerization of a conjugated diolefin in the presence of a finely divided and dispersed alkali metal as a polymerization catalyst, the improvement which comprises using as said catalyst a dispersion of an alkali metal and an alkali metal mercaptide in a liquid hydrocarbon prepared as in the process of claim 12.

15. A method for the preparation of a dispersion of metallic sodium in xylene which consists of adding from 5 to 35 weight per cent metallic sodium to liquid xylene and comminuting said sodium in said xylene by vigorous agitation at 210 to 230° F. and in the presence of 0.5 to 5 weight per cent, based on the sodium, of sodium tertiary dodecyl mercaptide, for a time sufficient to give particles of sodium having an average diameter of 0.01 to 0.02 mm., and cooling a resulting dispersion to below the melting point of sodium.

16. A method for the preparation of a dispersion of an alkali metal in an inert liquid hydrocarbon boiling above the melting point of said alkali metal which consists of adding from 5 to 35 weight per cent of an alkali metal to such an inert liquid hydrocarbon and comminuting said alkali metal in said liquid hydrocarbon by vigorous agitation at a temperature above the melting point of said alkali metal and in the presence of 0.5 to 5 weight per cent, based on said alkali metal, of a mercaptide of said alkali metal having 8 to 20 carbon atoms per molecule for a time sufficient to give particles of said alkali metal having an average diameter of 0.01 to 0.02 mm., and cooling a resulting dispersion to below the melting point of said alkali metal.

17. A composition of matter consisting of liquid xylene containing 5 to 35 weight per cent of sodium dispersed therein in the form of particles having an average diameter of 0.01 to 0.02 mm., and 0.5 to 5 weight per cent, based on the sodium, of sodium tertiary dodecyl mercaptide.

18. A composition of matter consisting of a normally liquid inert hydrocarbon containing 5 to 35 weight per cent of an alkali metal dispersed therein in the form of particles having an average diameter of 0.01 to 0.02 mm., and 0.05 to 5 weight per cent, based on said alkali metal, of a mercaptide of an alkali metal containing 8 to 20 carbon atoms per molecule.

WILLIE W. CROUCH.

REFERENCES CITED

The following references are of record in the file of this patent:

UNITED STATES PATENTS

| Number | Name | Date |
| --- | --- | --- |
| 1,227,259 | Gotty | May 22, 1917 |
| 2,209,746 | Ebert | July 30, 1940 |
| 2,338,741 | Soday | Jan. 11, 1944 |
| 2,409,519 | Tanner | Oct. 15, 1946 |

FOREIGN PATENTS

| Number | Country | Date |
| --- | --- | --- |
| 324,489 | Great Britain | Jan. 30, 1930 |
| 537,701 | Great Britain | July 3, 1941 |